(12) United States Patent
Taylor et al.

(10) Patent No.: US 7,581,238 B1
(45) Date of Patent: Aug. 25, 2009

(54) PROGRAM EPISODES RECORDING

(75) Inventors: Thomas H. Taylor, Redmond, WA (US); Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 1255 days.

(21) Appl. No.: 10/131,849

(22) Filed: Apr. 25, 2002

(51) Int. Cl.
G06F 3/00 (2006.01)
G06F 13/00 (2006.01)
H04N 5/91 (2006.01)
H04N 5/445 (2006.01)

(52) U.S. Cl. .............................. 725/58; 725/61; 725/39; 386/83

(58) Field of Classification Search ................... 725/58, 725/61, 39; 386/83
See application file for complete search history.

(56) References Cited

U.S. PATENT DOCUMENTS

| | | | | |
|---|---|---|---|---|
| 5,371,551 A * | 12/1994 | Logan et al. | ............... | 348/571 |
| 5,699,107 A | 12/1997 | Lawler et al. | | |
| 5,758,259 A | 5/1998 | Lawler | | |
| 5,805,763 A | 9/1998 | Lawler et al. | | |
| 5,815,145 A | 9/1998 | Matthews, III | | |
| 5,907,323 A | 5/1999 | Lawler et al. | | |
| 5,923,362 A * | 7/1999 | Klosterman | ............... | 725/48 |
| 5,988,078 A * | 11/1999 | Levine | ............... | 715/721 |
| 6,118,926 A * | 9/2000 | Kim et al. | ............... | 386/83 |
| 6,177,931 B1 * | 1/2001 | Alexander et al. | ............... | 725/52 |
| 6,208,799 B1 * | 3/2001 | Marsh et al. | ............... | 386/83 |
| 6,311,011 B1 | 10/2001 | Kuroda | | |
| 6,324,338 B1 * | 11/2001 | Wood et al. | ............... | 386/83 |
| 6,424,791 B1 * | 7/2002 | Saib | ............... | 386/83 |
| 6,601,074 B1 * | 7/2003 | Liebenow | ............... | 707/104.1 |
| 6,650,824 B1 | 11/2003 | Horlander et al. | | |
| 6,738,559 B1 | 5/2004 | Yoo et al. | | |
| 6,760,535 B1 * | 7/2004 | Orr | ............... | 386/46 |
| 7,047,549 B2 * | 5/2006 | Schein et al. | ............... | 725/43 |
| 7,369,750 B2 * | 5/2008 | Cheng et al. | ............... | 386/83 |
| 2001/0043795 A1 * | 11/2001 | Wood et al. | ............... | 386/69 |
| 2002/0038457 A1 * | 3/2002 | Numata et al. | ............... | 725/47 |
| 2002/0054068 A1 * | 5/2002 | Ellis et al. | ............... | 345/716 |
| 2003/0198461 A1 * | 10/2003 | Taylor et al. | ............... | 386/83 |
| 2004/0013409 A1 * | 1/2004 | Beach et al. | ............... | 386/83 |
| 2005/0204388 A1 * | 9/2005 | Knudson et al. | ............... | 725/58 |
| 2008/0184297 A1 * | 7/2008 | Ellis et al. | ............... | 725/39 |
| 2008/0216120 A1 * | 9/2008 | Knudson et al. | ............... | 725/40 |

OTHER PUBLICATIONS

Donald, et al.; "Online Television Library: Organisation and Content Browsing for General Users"; Proc.SPIE vol. 4315; pp. 311-319.

* cited by examiner

Primary Examiner—Hoang-Vu A Nguyen-Ba
(74) Attorney, Agent, or Firm—Lee & Hayes, PLLC

(57) ABSTRACT

A client device for a television-based entertainment system receives a viewer request to record episodes of a program and generates an episode record chart that designates a start time to record the episodes on one or more broadcast dates. The client device establishes a time window that can include a first time period before the designated start time to record the episodes and a second time period after the designated start time to record the episodes. The client device determines whether additional episodes of the program are scheduled for broadcast within the time window, which may include on any broadcast channel one or more days of the week, and if so, generates an episode exclude chart that designates one or more episode broadcast times on one or more days of the week to identify the additional episodes of the program that will not be recorded.

33 Claims, 10 Drawing Sheets

Channel Programming Lineup for Sunday

| | 7:30 PM | 8:00 PM | 8:30 PM | 9:00 PM |
|---|---|---|---|---|
| 2 - ABC | Seinfeld | Movie | | |
| 3 - FOX | King of the Hill | The Symptoons | New / Special Episode | ... |
| 4 - CBS | Drew Carey | Movie | | |
| ... | | | | |

| 6:00 PM | 6:30 PM | 7:00 PM | 7:30 PM | 8:00 PM |
|---|---|---|---|---|

Sunday Programming (*Fig. 6A*) — 600

| News | Paid Program | | King of ... | The Symptoons |
|---|---|---|---|---|

602

Monday Programming (*Fig. 4A*) — 400

| The Symptoons | The Symptoons | | King of ... | Star Trek: ... |
|---|---|---|---|---|

PROGRAM EPISODES RECORDING

TECHNICAL FIELD

This invention relates to television entertainment architectures and, in particular, to systems and methods for program episodes recording.

BACKGROUND

Client devices in a television-based entertainment system can be set-up to record an episode of a television program and any subsequent episodes of the program on the same day of the week and at the same time. However, due to television program scheduling variations, the task of simply recording the weekly episode of a particular program is difficult to schedule. Television program providers often vary the program scheduling by pre-empting episodes of the television programs, moving the episodes to a new day and/or time, broadcasting a special episode of a longer than normal time duration, and the like. These unexpected variations in program scheduling can cause a video recording system to miss recording all or part of an episode of a television program. A television viewer expecting to have recorded a particular weekly episode of a program, for example, will be disappointed when the last ten minutes of the program was not recorded because the client device did not account for a longer than normal time duration of a special episode of the program.

Another variation in television program scheduling occurs when a scheduled weekly episode of a particular program is directly followed by a special "back-to-back" new episode of the program that a television viewer would also want to have recorded. Conventional client devices do not differentiate between a new episode of a program shown at a special time that a viewer would want to have recorded and a regularly scheduled re-run episode of the program that does not need to be recorded. In addition to new episodes of a weekly television program, such as with prime-time drama programs, new episodes of television programs can be shown daily, such as with day-time television programs, or even hourly, such as with news programs and sports reports.

Client devices can be set-up to record every episode of a particular television program shown during the week to ensure that the one desired, or new, episode is also recorded. However, this approach leaves the viewer having to sort through several re-runs and unwanted episodes of the program to find the intended new episode. In addition, recording unwanted programs unnecessarily utilizes system resources, such as taking up space on a memory storage device of the recording system. Further, a desired episode of the program may be recorded over with an unwanted episode of the program if the memory storage device is full and unable to accommodate a subsequent recording.

Accordingly, for television-based entertainment systems, there is a need for techniques to ensure that only desired episodes of a television program are recorded in their entirety, even when a television program provider varies the scheduled broadcast time for the particular program, and/or adds a new episode of is the program to the schedule.

SUMMARY

A client device for a television-based entertainment system receives a viewer request to record episodes of a program and generates an episode record chart that designates a start time to record the episodes on one or more days of the week. The client device establishes a time window that can include a first time period before the designated start time to record the episodes and a second time period after the designated start time to record the episodes. The client device determines whether additional episodes of the program are scheduled for broadcast within the time window. The client device may include determining whether additional episodes of the program are scheduled for broadcast within the time window on any broadcast channel and/or for one or more days of the week. If additional episodes of the program are scheduled for broadcast within the time window, the client device generates an episode exclude chart to designate the additional episodes of the program that will not be recorded.

BRIEF DESCRIPTION OF THE DRAWINGS

The same numbers are used throughout the drawings to reference like features and components.

FIGS. 6A and 6B illustrate sections of example program guides.

DETAILED DESCRIPTION

The following discussion is directed to television-based entertainment systems, such as interactive TV networks, cable networks that utilize electronic program guides, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and methods can be used in any of these systems and for any types of client devices, they are described in the context of the following exemplary environment.

Exemplary System Architecture

Figure 1:
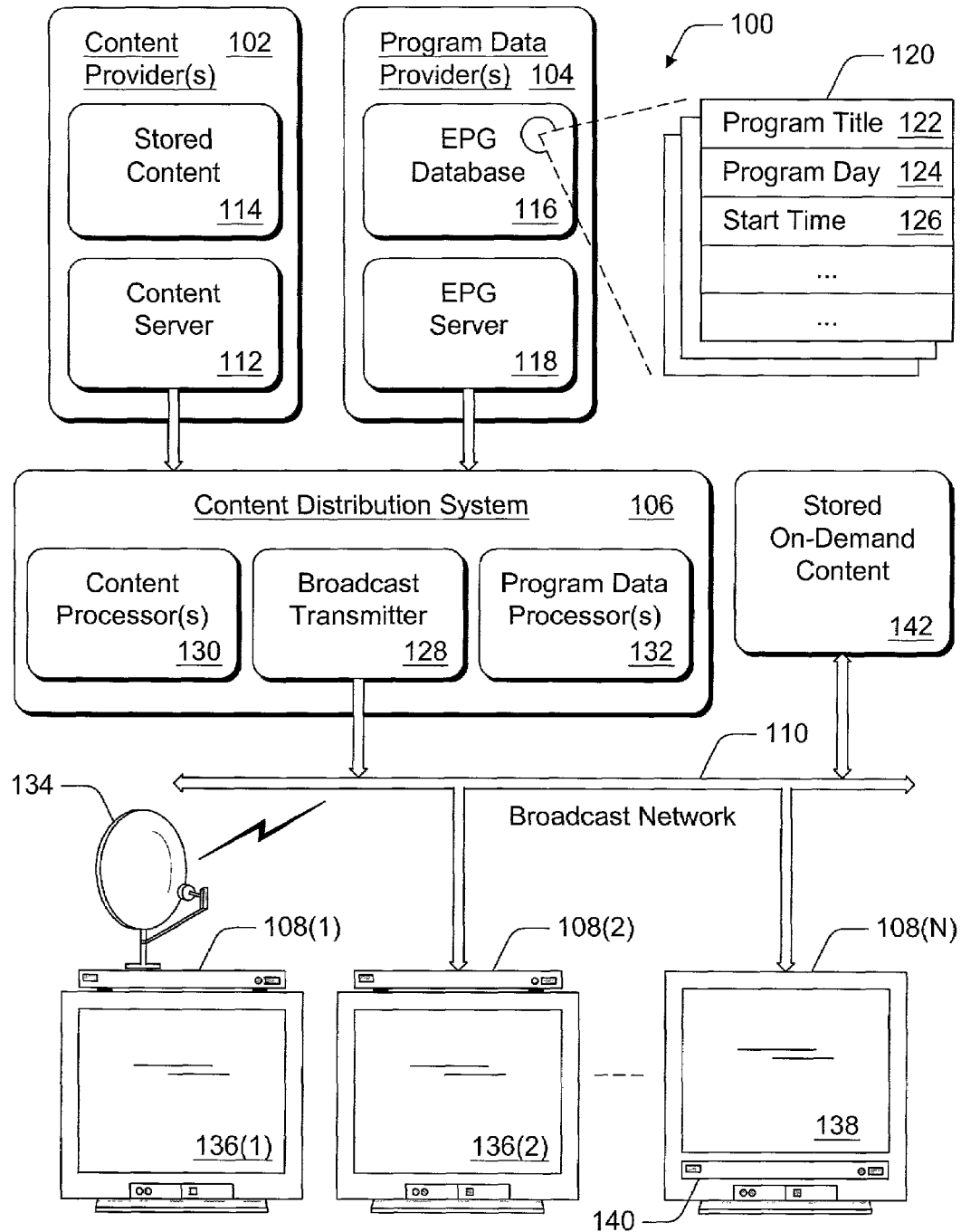
FIG. 1 illustrates an exemplary system architecture in which the systems and methods for program episodes recording can be implemented.

FIG. 1 illustrates an exemplary television entertainment system 100 that is an architecture in which program episodes recording may be implemented. System 100 facilitates distribution of content and program data to multiple viewers. The system 100 includes one or more content providers 102, one or more program data providers 104, a content distribution system 106, and multiple client devices 108(1), 108(2), . . . , 108(N) coupled to the content distribution system 106 via a broadcast network 110.

Content provider 102 includes a content server 112 and stored content 114, such as movies, television programs, commercials, music, and similar audio and/or video content. Content server 112 controls distribution of the stored content 114 from content provider 102 to the content distribution system 106. Additionally, content server 102 controls distribution of live content (e.g., content that was not previously stored, such as live feeds) and/or content stored at other locations to the content distribution system 106.

Program data provider 104 includes an electronic program guide (EPG) database 116 and an EPG server 118. The EPG database 116 stores electronic files of program data 120 which is used to generate an electronic program guide (or, "program guide"). Program data includes program titles, ratings, characters, descriptions, actor names, station identifiers, channel identifiers, schedule information, and so on. The terms "program data" and "EPG data" are used interchangeably throughout this discussion. For discussion purposes, an electronic file maintains program data 120 that may include a program title 122, a program day or days 124 to identify which days of the week the program will be shown, and a start time or times 126 to identify the time that the program will be shown on the particular day or days of the week.

The EPG server 118 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The EPG server 118 controls distribution of the published version of the program data from program data provider 104 to the content distribution system 106 using, for example, a file transfer protocol (FTP) over a TCP/IP network (e.g., Internet, UNIX, etc.). Further, the published version of the program data can be transmitted from program data provider 102 via a satellite directly to a client device 108.

Content distribution system 106 includes a broadcast transmitter 128, one or more content processors 130, and one or more program data processors 132. Broadcast transmitter 128 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

Content processor 130 processes the content received from content provider 102 prior to transmitting the content across broadcast network 110. Similarly, program data processor 132 processes the program data received from program data provider 104 prior to transmitting the program data across broadcast network 110. A particular content processor 130 may encode, or otherwise process, the received content into a format that is understood by the multiple client devices 108(1), 108(2), ..., 108(N) coupled to broadcast network 110. Although FIG. 1 shows a single content provider 102, a single program data provider 104, and a single content distribution system 106, exemplary system 100 can include any number of content providers and/or program data providers coupled to any number of content distribution systems.

Content distribution system 106 is representative of a headend service that provides EPG data, as well as content, to multiple subscribers. Each content distribution system 106 may receive a slightly different version of the program data that takes into account different programming preferences and lineups. The EPG server 118 creates different versions of EPG data (e.g., different versions of a program guide) that include those channels of relevance to respective headend services, and the content distribution system 106 transmits the EPG data to the multiple client devices 108(1), 108(2), ..., 108(N). In one implementation, for example, content distribution system 106 utilizes a carousel file system to repeatedly broadcast the EPG data over an out-of-band (OOB) channel to the client devices 108.

Client devices 108 can be implemented in a number of ways. For example, a client device 108(1) receives broadcast content from a satellite-based transmitter via a satellite dish 134. Client device 108(1) is also referred to as a set-top box or a satellite receiving device. Client device 108(1) is coupled to a television 136(1) for presenting the content received by the client device (e.g., audio data and video data), as well as a graphical user interface. A particular client device 108 can be coupled to any number of televisions 136 and/or similar devices that can be implemented to display or otherwise render content. Similarly, any number of client devices 108 can be coupled to a single television 136.

Client device 108(2) is also coupled to receive broadcast content from broadcast network 110 and provide the received content to associated television 136(2). Client device 108(N) is an example of a combination television 138 and integrated set-top box 140. In this example, the various components and functionality of the set-top box are incorporated into the television, rather than using two separate devices. The set-top box integrated into the television can receive broadcast signals via a satellite dish (similar to satellite dish 134) and/or via broadcast network 110. In alternate implementations, client devices 108 may receive broadcast signals via the Internet or any other broadcast medium.

Each client device 108 runs an electronic program guide (EPG) application that utilizes the program data. An EPG application enables a television viewer to navigate through an onscreen program guide and locate television shows of interest to the viewer. With an EPG application, the television viewer can look at schedules of current and future programming, set reminders for upcoming programs, and/or enter instructions to record one or more television shows.

The exemplary system 100 also includes stored on-demand content 142, such as Video On-Demand (VOD) movie content. The stored on-demand content can be viewed with a television 136 via a client device 108 through an onscreen movie guide, for example, and a viewer can enter instructions to stream a particular movie, or other stored content, down to a corresponding client device 108.

Exemplary Client Device

Figure 2:
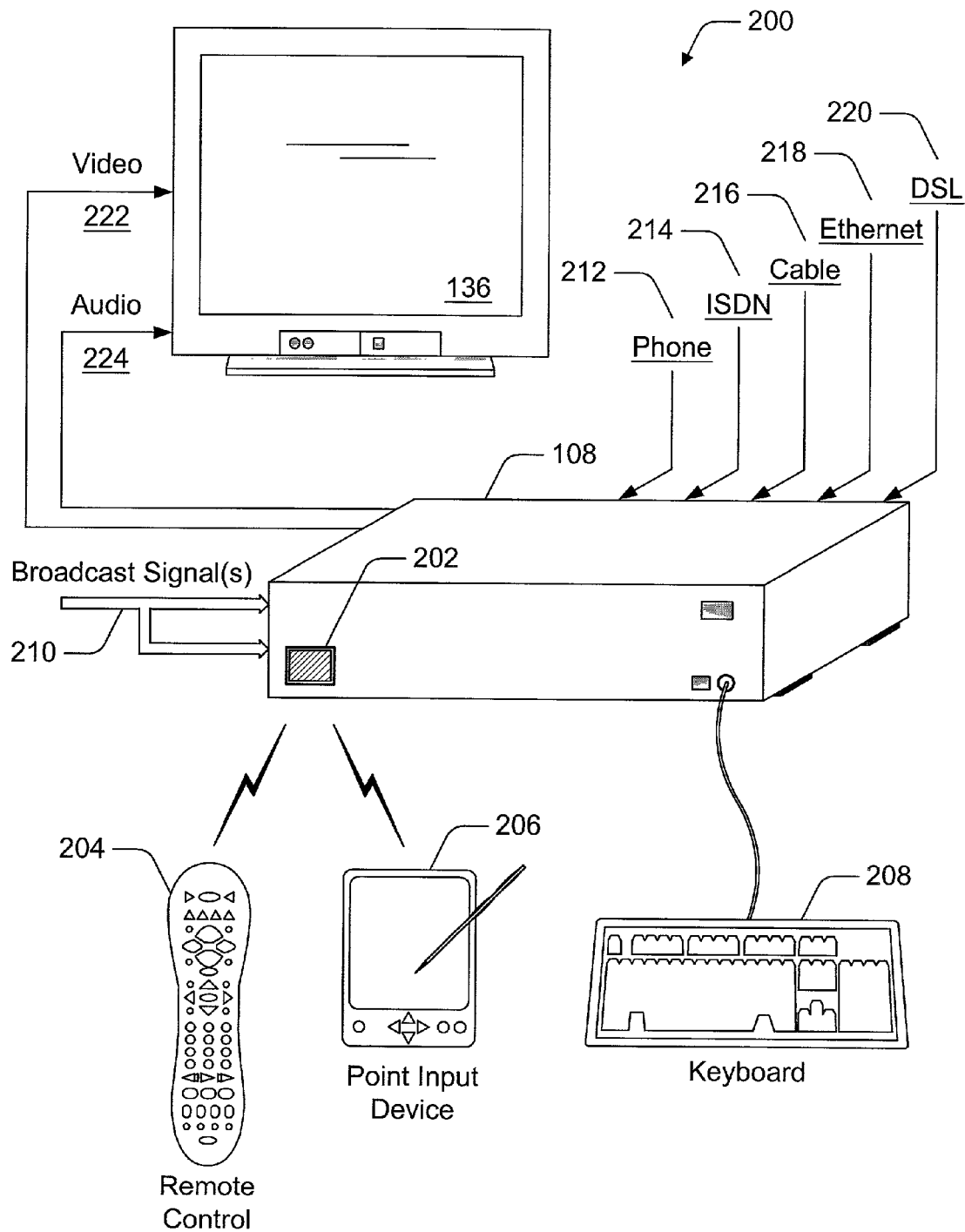
FIG. 2 illustrates of an example client device, a television, and various input devices that interact with the client device.

FIG. 2 illustrates an exemplary implementation 200 of a client device 108 shown as a standalone unit that connects to a television 136. Client device 108 can be implemented in any number of embodiments, including as a set-top box, a satellite receiver, a TV recorder with a hard disk, a digital video record (DVR) and playback system, a game console, an information appliance, and so forth.

Client device 108 includes a wireless port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 can be coupled to communicate with client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite or from a broadcast network, such as broadcast network 110 (FIG. 1). Client device 108 includes hardware and/or software for receiving and decoding a broadcast signal 210, such as an NTSC, PAL, SECAM or other TV system video signal. Client device 108 also includes hardware and/or software for providing the user with a graphical user interface by which the user can, for example, access various network services, configure client device 108, and perform other functions.

Client device 108 can communicate with other devices via one or more connections including a conventional telephone line 212, an ISDN link 214, a cable link 216, an Ethernet link 218, a DSL link 220, and the like. Client device 108 may use any one or more of the various communication links 212-220 at a particular instant to communicate with any number of other devices.

Client device 108 generates video signal(s) 222 and audio signal(s) 224, both of which are communicated to television 136. The video signals and audio signals can be communicated from client device 108 to television 136 via an RF (radio frequency) link, S-video link, composite video link, component video link, or other communication link. Although not shown in FIG. 2, client device 108 may include one or more lights or other indicators identifying the current status of the device. Additionally, the client device may include one or more control buttons, switches, or other selectable controls for controlling operation of the device.

Figure 3:
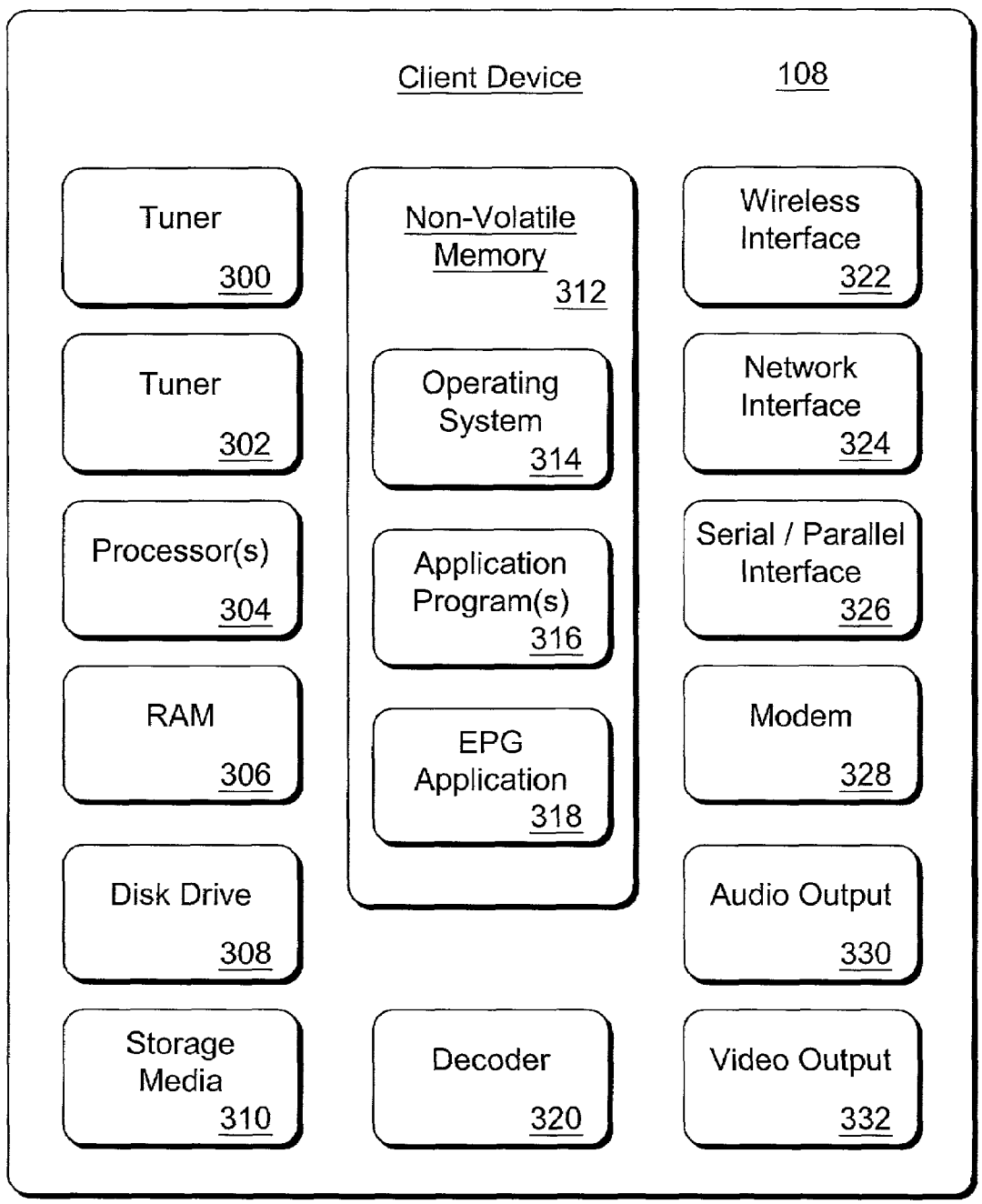
FIG. 3 is a block diagram that illustrates components of the example client device(s) shown in FIGS. 1 and 2.

FIG. 3 illustrates selected components of exemplary client device 108 shown in FIGS. 1 and 2. Client device 108 includes a first tuner 300 and an optional second tuner 302. The tuners 300 and 302 are representative of one or more in-band tuners that tune to various frequencies or channels to receive television signals, as well as an out-of-band tuner that tunes to the broadcast channel over which the EPG data is broadcast to client device 108.

Client device 108 also includes one or more processors 304 which process various instructions to control the operation of client device 108 and to communicate with other electronic and computing devices. Client device 108 can be implemented with one or more memory components, examples of which include a random access memory (RAM) 306, a disk drive 308, a mass storage component 310, and a non-volatile memory 312 (e.g., ROM, Flash, EPROM, EEPROM, etc.). The memory components (e.g., RAM 306, disk drive 308, storage media 310, and non-volatile memory 312) store various information and/or data such as received content, EPG data, configuration information for client device 108, and/or graphical user interface information.

Alternative implementations of client device 108 can include a range of processing and memory capabilities, and may include more or fewer types of memory components than those illustrated in FIG. 3. For example, full-resource clients can be implemented with substantial memory and processing resources, including the disk drive 308 to store content for replay by the viewer. Low-resource clients, however, may have limited processing and memory capabilities, such as a limited amount of RAM 306, no disk drive 308, and limited processing capabilities of a processor 304.

An operating system 314 and one or more application programs 316 may be stored in non-volatile memory 312 and executed on processor 304 to provide a runtime environment. A runtime environment facilitates extensibility of client device 108 by allowing various interfaces to be defined that, in turn, allow application programs 316 to interact with client device 108. In the illustrated example, an EPG application 318 is stored in memory 312 to operate on the EPG data and generate a program guide. The application programs 316 that may be implemented at client device 108 can include a browser to browse the Web (e.g., "World Wide Web"), an email program to facilitate electronic mail, and so on. Client device 108 can also include other components pertaining to a television entertainment system which are not illustrated in this example. For instance, client device 108 can include a user interface application and user interface lights, buttons, controls, and the like to facilitate viewer interaction with the device.

Client device 108 also includes a decoder 320 to decode a broadcast video signal, such as an NTSC, PAL, SECAM or other TV system video signal. Client device 108 further includes a wireless interface 322, a network interface 324, a serial and/or parallel interface 326, and a modem 328. Wireless interface 322 allows client device 108 to receive input commands and other information from a user-operated input device, such as from a remote control device or from another IR, Bluetooth, or similar RF input device.

Network interface 324 and serial and/or parallel interface 326 allows client device 108 to interact and communicate with other electronic and computing devices via various communication links. Although not shown, client device 108 may also include other types of data communication interfaces to communicate with other devices. Modem 328 facilitates client device 108 communication with other electronic and computing devices via a conventional telephone line.

Client device 108 also includes an audio output 330 and a video output 332 that provide signals to a television or other device that processes and/or presents or otherwise renders the audio and video data. Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Exemplary Program Episodes Recording

Figure 4A:
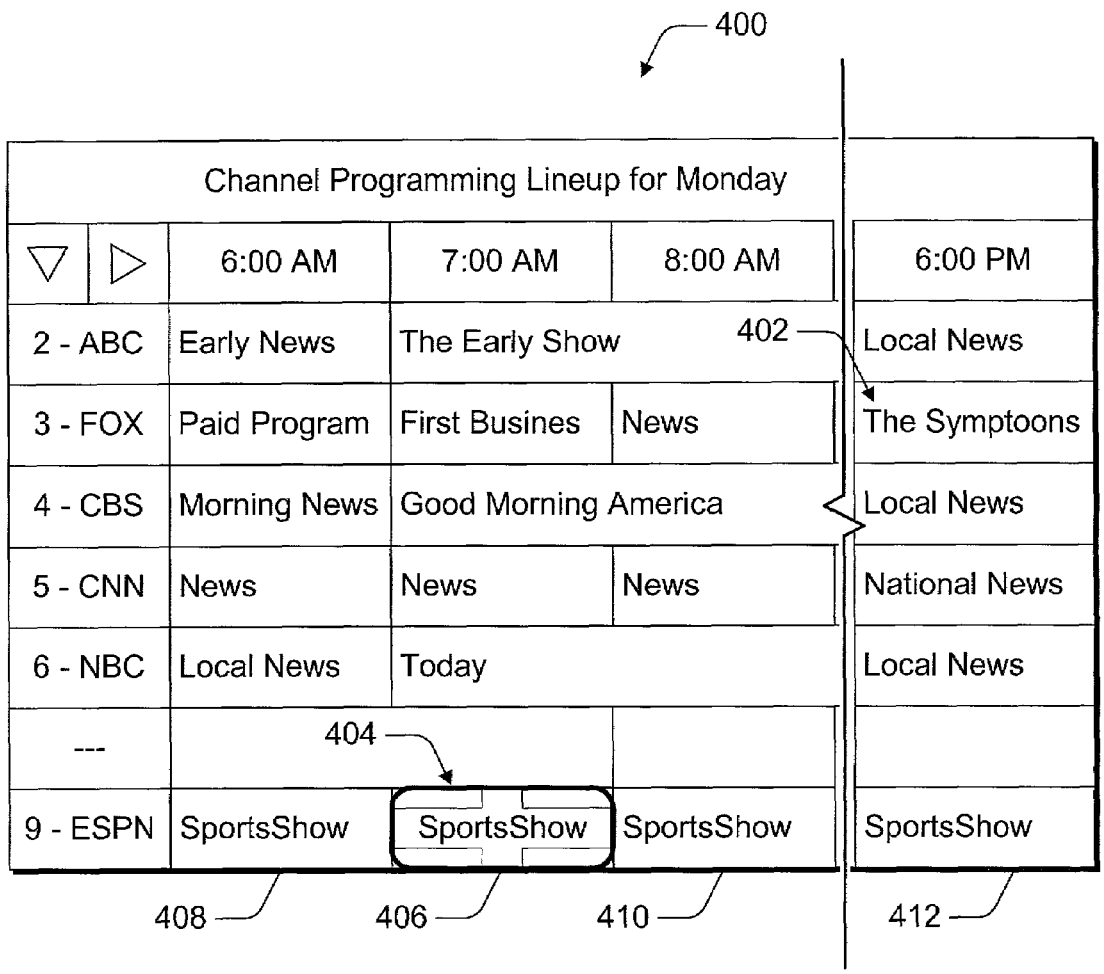
FIGS. 4A and 4B illustrate a section of an example program guide.

FIG. 4A illustrates an example of a program guide 400 that shows part of a channel programming lineup for a Monday. Program guide 400 is generated with an electronic program guide (EPG) application 318 in client device 108 with program data 120, and displayed on television 136 (FIGS. 1-3). The program guide 400 provides a viewer with a program title, the associated local channel number and/or television broadcasting company that will broadcast the program, and a time of the day that the program will be broadcast. For example, an episode 402 of the television program The Symptoons is scheduled for broadcast on local channel three (3) at 6:00 p.m.

Program guide 400 includes a focus 404 to identify a program title that a viewer can select to view the program if it is currently being broadcast, access program data to learn more about the program, and/or enter a request to record one or more episodes of the program. A viewer can move focus 404 within program guide 400 by manipulating remote control 204, for example, to input a focus control command to client device 108. As shown, focus 404 identifies an episode 406 of the program SportsShow that is scheduled for broadcast by ESPN on local channel nine (9) at 7:00 a.m. With remote control 204, a viewer can enter a request to record the episode broadcasts of SportsShow at 7:00 a.m. each day of the week. Program guide 400 also shows that episodes 408, 410, and 412 of SportsShow are scheduled for broadcast on channel nine (9) at 6:00 a.m., 8:00 a.m., and 6:00 p.m., respectively.

Figure 4B:
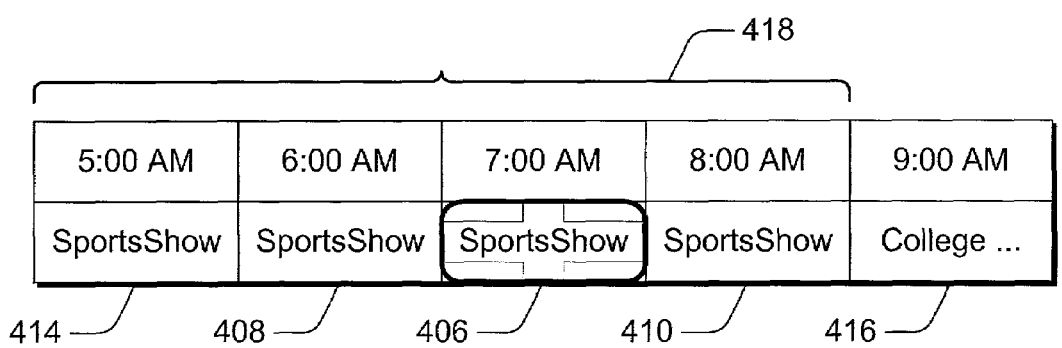

FIG. 4B further illustrates a part of program guide 400 that shows the programming lineup for local channel nine (9) only. The program guide 400 shows the episodes 406, 408, and 410 of SportsShow that are scheduled for broadcast at 7:00 a.m., 6:00 a.m., and 8:00 a.m., respectively. In addition, program guide 400 shows another episode 414 of SportsShow scheduled for broadcast at 5:00 a.m., and an episode 416 of another program identified as College . . . scheduled for broadcast at 9:00 a.m.

A time window 418 (identified by the bracket above the scheduled program broadcast times) is associated with program episode 406 in program guide 400. Time window 418 includes a first time period from 5:00 a.m. to 7:00 a.m. which is a two hour time period before the scheduled broadcast at 7:00 a.m. of the SportsShow episode 406. Time window 418 also includes a second time period from 7:00 a.m. to 9:00 a.m. which is a two hour time period after the start of the scheduled broadcast of program episode 406. Thus, time window 418 is a four-hour time window centered about the 7:00 a.m. broadcast start time of the SportsShow episode 406.

It is to be appreciated that the described four-hour time window 418 is merely exemplary. Those skilled in the art will recognize that a time window of any duration (e.g., three hours, five hours, etc.) can be implemented to include any combination of first and second time periods. For example, a three-hour time window can be implemented to include a one-hour time period before the scheduled broadcast start time of a program episode, and a two-hour time period after the scheduled broadcast start time of the program episode. Further, a time window can be implemented to include an entire day of program listings from 12:00 a.m. to 12:00 p.m. (i.e., twenty-four hours). A time window can also be based on a designated program viewing time, such as "soap operas" which might include a time window from 11:00 a.m. to 3:00 p.m., or based on a Network television primetime designation which is typically 8:00 p.m. to 11:00 p.m. (Pacific time), by current convention.

When a client device in a television recording system is set-up to record episodes of a program, a time window is implemented about the designated episode broadcast time. A recording application in the client device, such as an application program 316 in client device 108 (FIG. 3), can determine whether additional episodes of the program are scheduled for broadcast within the time window, and the recording application can determine whether to exclude or record the additional episodes of the program. Further, an implementation of a recording application can be customized to accommodate different viewing and recording preferences while maintaining the goal to provide a viewer recordings of the program episodes that are requested, while excluding unwanted episodes of the same program.

For example, if a viewer request to record episodes of a program corresponds to the SportsShow episode 406 which is scheduled for broadcast on a Monday at 7:00 a.m. (e.g., program guide 400 shows a Monday programming lineup), recording application 316 determines whether one or more additional episodes of the program are scheduled for broadcast within time window 418. Three other SportsShow episodes 414, 408, and 410 are scheduled for broadcast at 5:00 a.m., 6:00 a.m., and 8:00 a.m., respectively, within the established time window 418.

Figure 5:
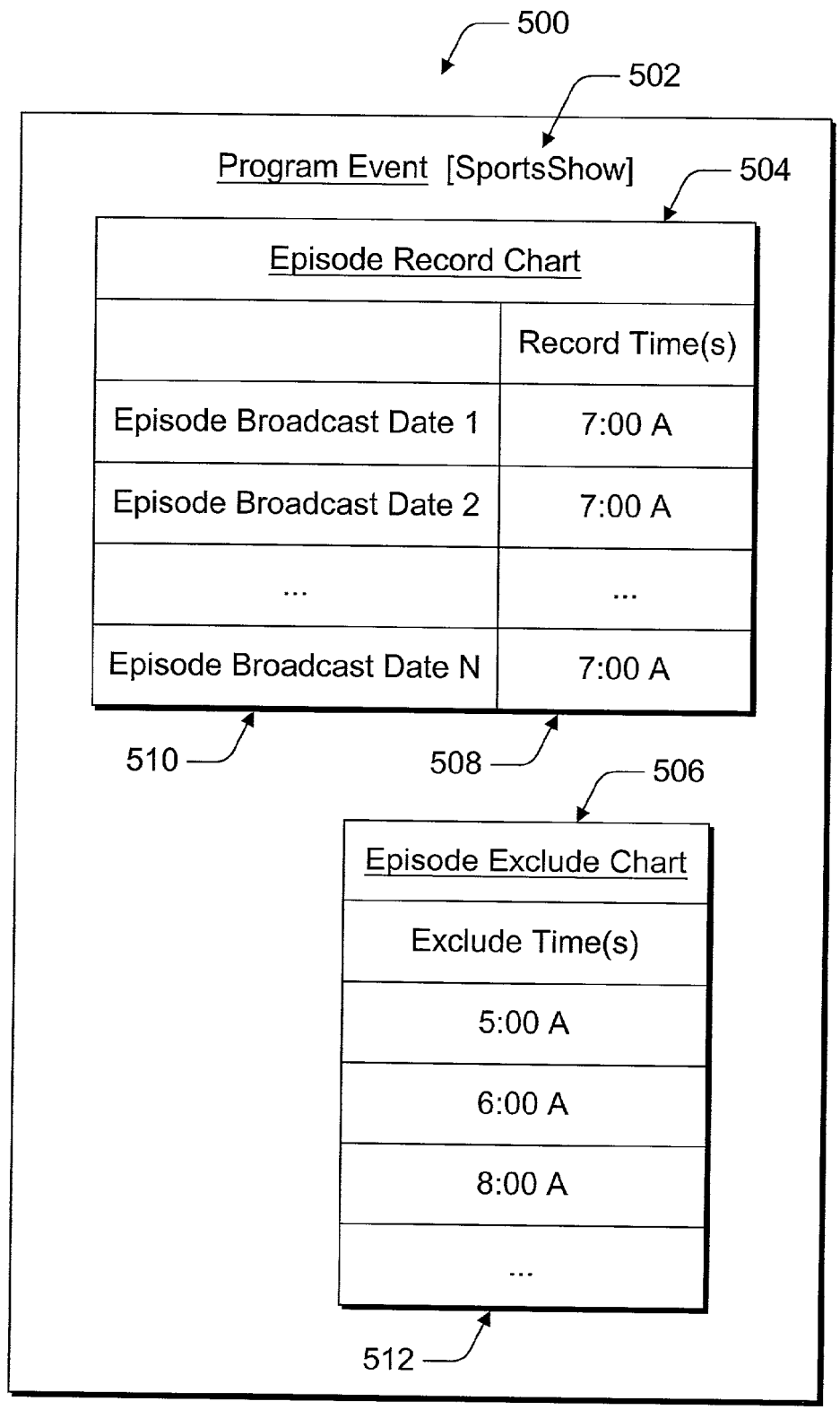
FIG. 5 illustrates a program event corresponding to a program episode shown in FIGS. 4A and 4B.

FIG. 5 illustrates a program event 500 that is implemented and associated with a particular program. In this example, program event 500 is associated with the SportsShow program by program identifier 502. Program event 500 includes an episode record chart 504 and an episode exclude chart 506. Program event 500, the episode record chart 504, and the episode exclude chart 506 can be implemented as a data structure, or each as independent data structures, or as any other relational information component(s).

It is to be appreciated that the program events and the episode record and exclude charts illustrated in the figures and described herein are merely illustrative of possible implementations and formats for associating television programming episode information. Furthermore, the programming episode information may be maintained as any other objects, components, electronic files, etc. that can be utilized to implement program episodes recording. Client device 108 can maintain data structures, such as for the program events and the episode record and exclude charts, with any of the examples of possible memory components which include the random access memory (RAM) 306, the disk drive 308, the mass storage component 310, and the non-volatile memory 312 (FIG. 3).

Episode record chart 504 maintains record start time(s) 508 that designate when to record an associated episode of a program on a particular episode broadcast date 510. For example, an episode broadcast of SportsShow (e.g., program identifier 502) is designated to be recorded at 7:00 a.m. on an upcoming episode broadcast date 510. Episode exclude chart 506 maintains one or more program episode broadcast times 512 to designate episodes of the program that will not be recorded. For example, the 5:00 a.m., 6:00 a.m., and 8:00 a.m. episode broadcasts of SportsShow (e.g., program identifier 502) will be excluded from being recorded.

FIG. 6A illustrates an example of a program guide 600 that shows part of a channel programming lineup for a Sunday. Program guide 600 is generated with electronic program guide (EPG) application 318 in client device 108 with program data 120, and displayed on television 136 (FIGS. 1-3). The program guide 600 provides a viewer with a program title, the associated local channel number and/or television broadcasting company that will broadcast the program, and a time of the day that the program will be broadcast. For example, an episode 602 of the television program The Symptoons is scheduled for broadcast on local channel three (3) at 8:00 p.m.

Program guide 600 includes a focus 604 to identify a program title that a viewer can select to view the program if it is currently being broadcast, access program data to learn more about the program, and/or enter a request to record one or more episodes of the program. A viewer can move focus 604 within program guide 600 by manipulating remote control 204, for example, to input a focus control command to client device 108. As shown, focus 604 identifies episode 602 of the program The Symptoons that is scheduled for broadcast by the FOX Network on local channel three (3) at 8:00 p.m. With remote control 204, a viewer can enter a request to record the episode broadcasts of The Symptoons at 8:00 p.m. each Sunday evening. Program guide 600 also shows that a new or special episode 606 is scheduled for broadcast on channel three (3) at 8:30 p.m. The new or special episode 606 may be a special episode of the preceding scheduled broadcast, such as a new episode of The Symptoons broadcast at a time that episodes of the program are not regularly scheduled for broadcast.

FIG. 6B further illustrates a part of program guides 600 (FIG. 6A) and 400 (FIG. 4A) that show the programming lineup for local channel three (3) from 6:00 p.m. to 8:30 p.m. on a Sunday and on a Monday, respectively. The section of program guide 600 shows the episode 602 of The Symptoons scheduled for broadcast at 8:00 p.m. on Sunday. The section of program guide 400 shows the episode 402 of The Symptoons scheduled for broadcast at 6:00 p.m. on Monday. In addition, the section of program guide 400 shows another episode 608 of The Symptoons scheduled for broadcast at 6:30 p.m. on Monday.

A time window 610 (identified by the bracket above the scheduled program broadcast times) is associated with program episode 602 in program guide 600 for Sunday. Time window 610 includes a first time period from 6:00 p.m. to 8:00 p.m. which is a two hour time period before the scheduled broadcast at 8:00 p.m. of The Symptoons episode 602. Further, the time window 610 can also include a second time period from 8:00 p.m. to 10:00 p.m. which is a two hour time period after the start of the scheduled broadcast of program episode 602. Alternatively, the time window 610 can also include a second time period after 8:30 p.m. which is a time period after the scheduled broadcast end of program episode 602. Those skilled in the art will recognize that a time window of any duration can be implemented to include only a time period before the scheduled broadcast time of a program episode, only a time period after the scheduled broadcast time of a program episode, or any combination of first and second time periods.

Figure 7:
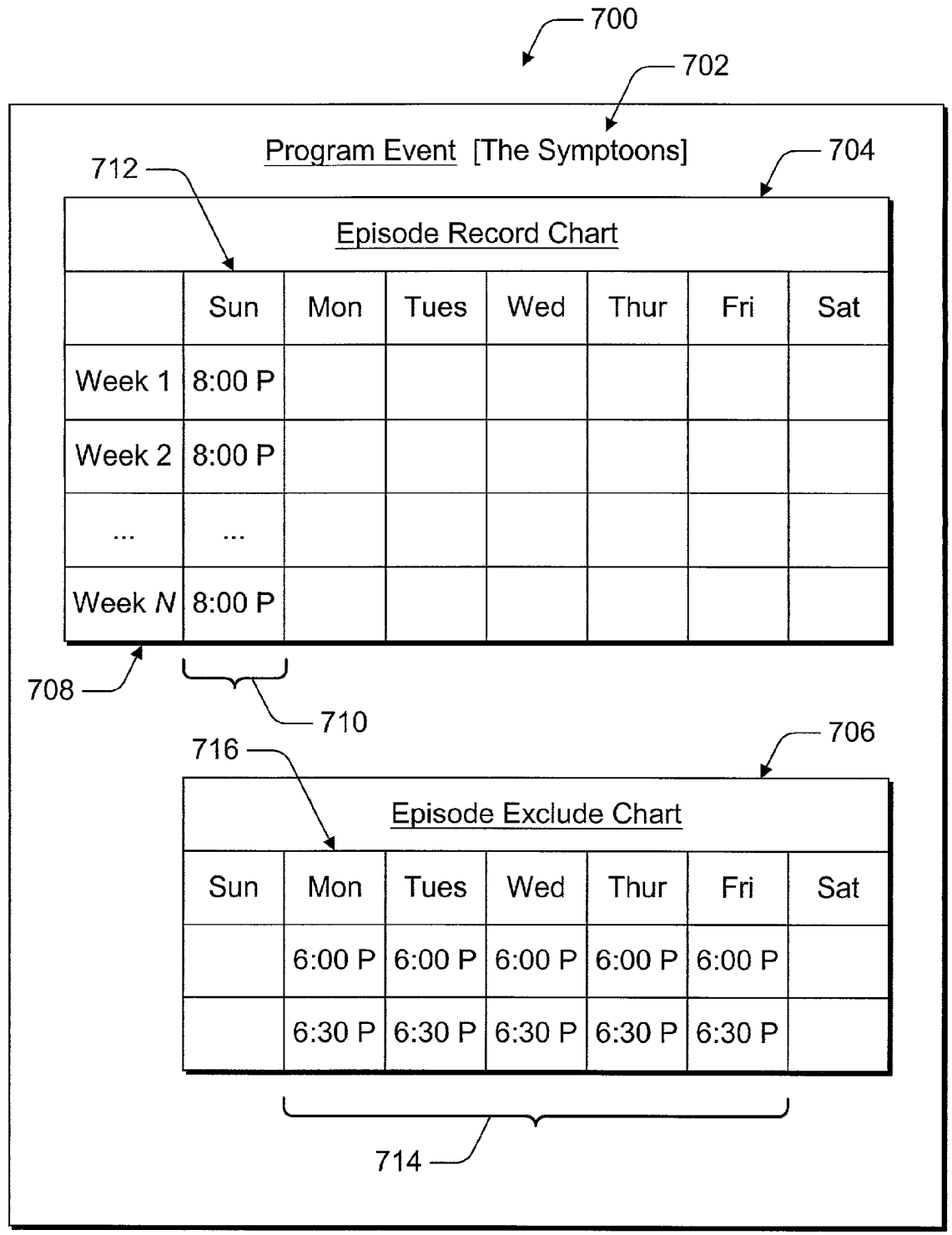
FIG. 7 illustrates a program event corresponding to a program episode shown in FIGS. 6A and 6B.

FIG. 7 illustrates a program event 700 that is implemented and associated with a particular program. Program event 700 is but one alternative implementation to program event 500 (FIG. 5). In this example, program event 700 is associated with The Symptoons program by program identifier 702. Program event 700 includes an episode record chart 704 and an episode exclude chart 706. Program event 700, the episode record chart 704, and the episode exclude chart 706 can be implemented as a data structure, or each as independent data structures, or as any other relational information component(s), such as objects, electronic files, etc. that can be utilized to implement program episodes recording. Client device 108 can maintain data structures, such as for the program events and the episode record and exclude charts, with any of the examples of possible memory components included within client device 108 (FIG. 3).

Episode record chart 704 maintains, for one or more weeks 708, record start time(s) 710 that designate when to record episodes of a program on one or more episode broadcast days 712. For example, on Sunday of each week 708, the 8:00 p.m. episode broadcast of The Symptoons (e.g., program identifier 702) is designated to be recorded. Episode exclude chart 706 maintains one or more program episode broadcast times 714 on one or more days 716 to designate episodes of the program that will not be recorded. For example, on Monday through Friday, the 6:00 p.m. and 6:30 p.m. episode broadcasts of The Symptoons (e.g., program identifier 702) will be excluded from being recorded.

Figure 8:
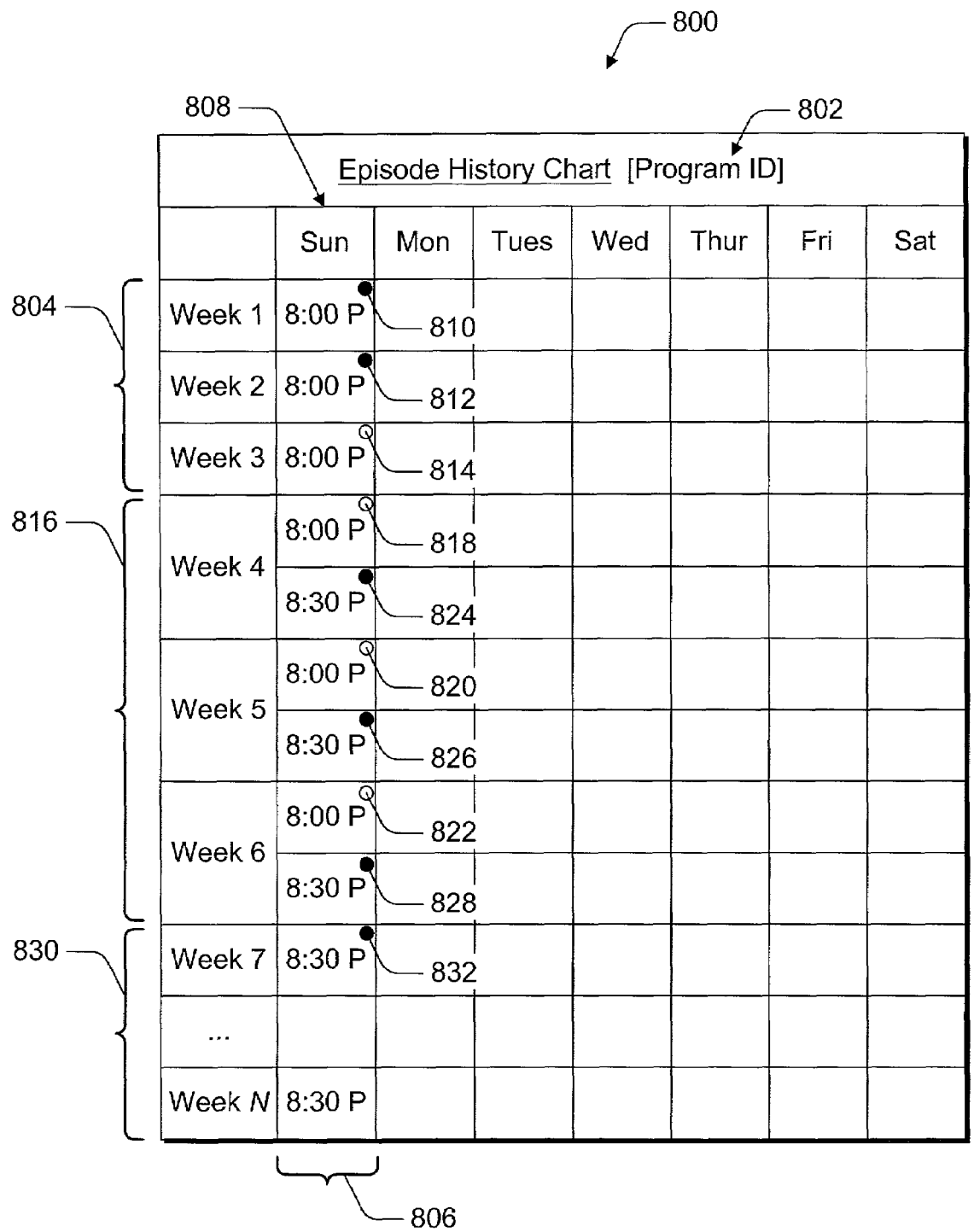
FIG. 8 illustrates an example of an episode record chart.

FIG. 8 illustrates an example of an episode history chart 800 that is implemented and associated with a particular program by program identifier 802. An episode history chart maintains information to indicate whether an episode of a program was scheduled for broadcast in the program data, whether the episode of the program was recorded at a scheduled episode broadcast time, whether the episode was broadcast as scheduled but not recorded, and/or whether the episode was not broadcast as scheduled and not recorded. The information can be evaluated to determine whether the episodes of a regularly scheduled program have been pre-empted or scheduled for broadcast at a different day and/or time.

In this example, episode history chart 800 maintains, for three weeks 804 (weeks 1-3), a scheduled episode broadcast time 806 to identify that an episode of the program was scheduled for broadcast in the program data at 8:00 p.m. on a Sunday 808. Each start time 806 includes a label 810, or any other type of indicator or identifier, to indicate that an episode of the program was recorded as scheduled. For example, labels 810 and 812 indicate (e.g., closed circle) that the episode was recorded at 8:00 p.m. on Sunday for week one (1) and week two (2). Label 814 indicates (e.g., open circle) that the program episode was not recorded during week three (3).

For three weeks 816 (weeks 4-6), the program episodes were not recorded at 8:00 p.m., as indicated by labels 818, 820, and 822. However, episodes of the program broadcast at 8:30 p.m., which were not originally designated to be recorded in weeks 1-3, are identified as having been recorded with labels 824, 826, and 828, respectively. For subsequent weeks 830 (week 7 . . . week N), the program episodes are recorded at 8:30 p.m., and the program episode for week seven (7) is identified as having been recorded with label 832.

Methods for Program Episodes Recording

Program episodes recording may be described in the general context of computer-executable instructions. Generally, computer-executable instructions include routines, programs, objects, components, data structures, and the like that perform particular functions or implement particular abstract data types. Program episodes recording may also be practiced in distributed computing environments where functions are performed by remote processing devices that are linked through a communications network. In a distributed computing environment, computer-executable instructions may be located in both local and remote computer storage media, including memory storage devices.

Figure 9:
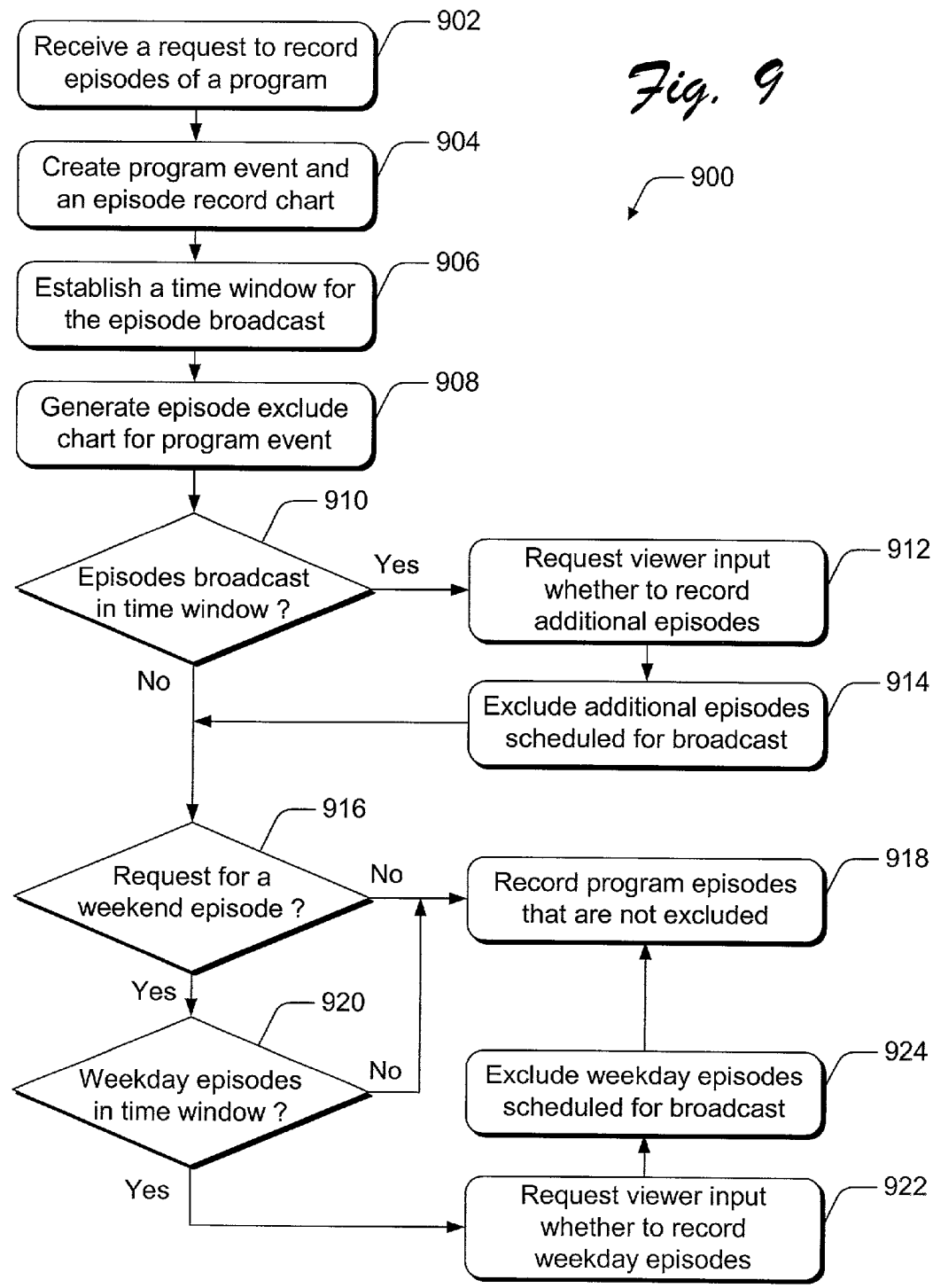
FIG. 9 is a flow diagram that illustrates a method for program episodes recording.

FIG. 9 illustrates a method 900 for program episodes recording. The order in which the method is described is not intended to be construed as a limitation, and any number of the described method blocks can be combined in any order to implement a method for program episodes recording. Furthermore, the method can be implemented in any suitable hardware, software, firmware, or combination thereof.

At block 902, a recording application receives a viewer request to record episodes of a program. A recording application can be implemented as one of application programs 316 in client device 108 (FIG. 3). A viewer request to record episodes of a program may be received as a remote control 204 input to client device 108, where the input corresponds to a focus in a program guide that identifies a selected program title.

For example, focus 404 in program guide 400 identifies the program title SportsShow for program episode 406. A viewer can select program episode 406 with remote control 204 and generate a request to record the 7:00 a.m. episodes of SportsShow on Mondays, or on each day of the week that episodes of the program are scheduled for broadcast at 7:00 a.m. Further, focus 604 in program guide 600 identifies the program title The Symptoons for program episode 602. The viewer can generate a request to record the 8:00 p.m. episodes of The Symptoons on Sundays.

At block 904, a program event, which includes an episode record chart, is created to record the episodes of the program that have been requested. For example, program event 500 is associated with the program SportsShow by program identifier 502 (FIG. 5). Further, program event 700 is associated with the program The Symptoms by program identifier 702 (FIG. 7).

Recording application 316 generates an episode record chart as a component of a program event. For example, episode record chart 504 is associated with the program Sports-Show and designates the start time of 7:00 a.m. to record the program episodes on future episode broadcast dates 510. Further, an episode record chart 704 is associated with the program The Symptoms and designates the start time of 8:00 p.m. to record the program episodes on Sundays 712 of the one or more weeks 708.

At block 906, a time window associated with the broadcast start time of the selected program episode is established. The time window can include a first time period before the scheduled broadcast start time of an episode of the program and can include a second time period after the scheduled broadcast start time of the episode. The first time period and the second time period may be consecutive such that a time window is established around the scheduled broadcast start time of the program episode. For example, time window 418 is associated with program episode 406 in program guide 400 and includes a first two hour time period before the 7:00 a.m. scheduled broadcast of episode 406 and includes a second two hour time period after the start of the scheduled broadcast to establish a time window centered about the episode broadcast start time. As described above, a time window can be of any duration and can be established to include any combination of first and second time periods. Further, a time window can be based on a designated program viewing time, such as on a Network television "primetime" designation if the episodes of the program that have been requested are broadcast on a national network, for example.

At block 908, an episode exclude chart is generated as a component of the program event. For example, episode exclude chart 506 is also associated with the program Sports-Show and designates one or more episode broadcast times 512 to identify episodes of the program that will not be recorded. Further, episode exclude chart 706 is associated with the program The Symptoms and designates one or more episode broadcast times 714 on one or more days of the week 716 to identify episodes of the program that will not be recorded.

At block 910, the recording application determines whether an additional episode, or episodes, of the program is scheduled for broadcast within the established time window. If additional episodes of the program are scheduled for broadcast within the time window (i.e., "yes" from block 910), a viewer input can optionally be requested at block 912 as to whether the additional episodes of the program scheduled to be broadcast within the time window should be recorded. This provides that a viewer has control over recording application default recording exclusions.

At block 914, all additional episodes of the program scheduled for broadcast within the established time window, and not selected to be recorded by a viewer, are excluded from being recorded. The scheduled episode broadcast times for the excluded additional episodes are designated in the associated episode exclude chart.

If additional episodes of the program are not scheduled for broadcast within the time window (i.e., "no" from block 910), or after additional episodes of the program are excluded from being recorded at block 914, the recording application determines whether the viewer request to record the episodes of the program corresponds to an episode scheduled for broadcast on a weekend day (i.e., Saturday or Sunday) at block 916. If the viewer request does not correspond to a weekend episode of the program (i.e., "no" from block 916), the requested episodes of the program and any episodes not excluded by a viewer request are recorded at block 918.

If the viewer request corresponds to a weekend episode of the program (i.e., "yes" from block 916), the recording application determines whether an additional episode, or episodes, of the program is scheduled for broadcast during a typical weekday within the time window on any broadcast channel at block 920. If weekday episodes of the program are not scheduled for broadcast during the established time window (i.e., "no" from block 920), the requested episodes of the program and any episodes not excluded by a viewer request are recorded at block 918.

If weekday episodes of the program are typically scheduled for broadcast within the established time window (i.e., "yes" from block 920), a viewer input is requested at block 922 as to whether the weekday episodes of the program scheduled to be broadcast within the time window should be recorded. At block 924, all weekday episodes of the program scheduled for broadcast within the time window and not selected to be recorded by a viewer are excluded from being recorded. The scheduled episode broadcast times for the excluded weekday episodes are designated in the associated episode exclude chart.

This procedure provides that new episodes of a program which may be scheduled for broadcast on a weekend day (i.e., Saturday or Sunday) are recorded, and any additional episodes of the program which may be regularly scheduled for broadcast on a week day (i.e., Monday through Friday) are not recorded, unless a viewer optionally does not exclude additional episodes.

For example, if the viewer request to record episodes of a program corresponds to episode 602 of the program The Symptoons which is scheduled for broadcast on a Sunday (e.g., program guide 600 shows a Sunday programming lineup), recording application 316 determines whether one or more additional episodes of the program are scheduled for broadcast within time window 610 on any broadcast channel on a Monday. Episode 402 of The Symptoons is scheduled for broadcast at 6:00 p.m. on Monday, and an episode 608 is scheduled for broadcast at 6:30 p.m. on Monday (FIG. 6B), both of which are scheduled for broadcast within time window 610. The scheduled broadcast times (i.e., 6:00 p.m. and 6:30 p.m.) for the additional episodes 402 and 608 of the program are designated in episode exclude chart 706 as broadcast times 714 Monday through Friday 716 to identify that the additional program episodes will not be recorded.

Figure 10:
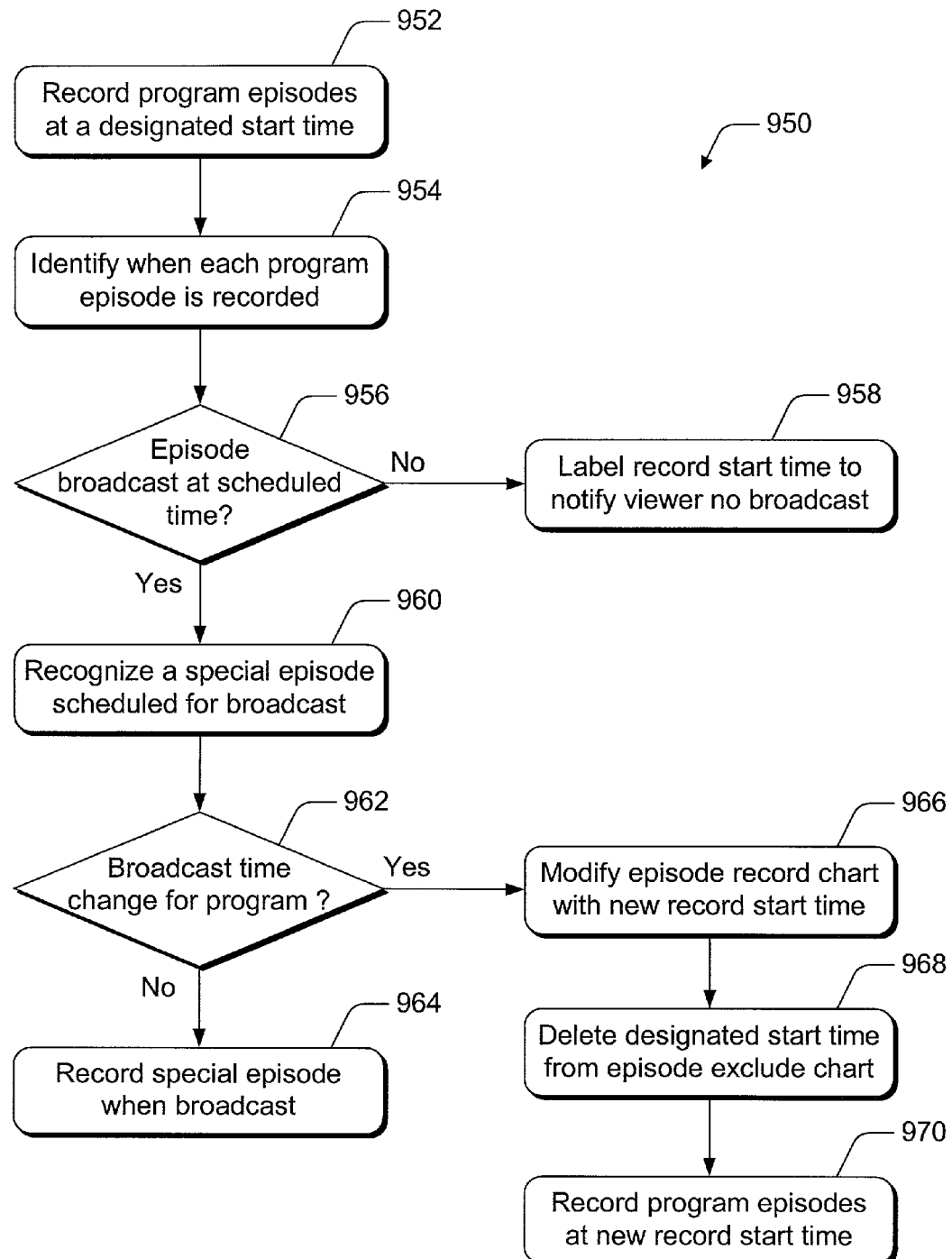
FIG. 10 is a flow diagram that illustrates a method for program episodes recording.

FIG. 10 illustrates a method 950 for program episodes recording. The order in which the method is described is not intended to be construed as a limitation, and any number of the described method blocks can be combined in any order to implement a method for program episodes recording. Furthermore, the method can be implemented in any suitable hardware, software, firmware, or combination thereof.

At block 952, program episodes are recorded at a start time designated in an associated episode record chart to record viewer-requested episodes of the program. For example, episode record chart 704 designates, for one or more weeks 708, a start time of 8:00 p.m. on Sundays to record an episode of The Symptoons (i.e., program identifier 702).

At block 954, an episode of the program is identified when the episode is recorded. For example, each scheduled broadcast start time 806 in episode history chart 800 has an associated label to indicate that an episode of the program was recorded as scheduled. Labels 810 and 812 indicate (e.g., closed circle) that the program episode was recorded at 8:00 p.m. on Sunday for week one (1) and week two (2). Label 814 indicates (e.g., open circle) that the program episode was not recorded during week three (3).

At block 956, the recording application determines whether an episode of the program is scheduled to be broadcast at a normally scheduled start time as designated in the episode history chart. For example, episode history chart 800 designates, that for week three (3), an episode of the program would normally be recorded at 8:00 p.m. on Sunday. However, due to Network television program scheduling, the program episode is not scheduled for broadcast at the regular time and label 814 indicates that the program episode was not recorded (e.g., open circle). At block 958, the broadcast start time is labeled, or otherwise identified, in the episode history chart for viewer-notification to indicate that the program episode was not broadcast at the start time. Label 814 in episode record chart 800 may also be implemented as a viewer-notification label, or indicator.

At block 960, the recording application recognizes a new or special episode of the program scheduled for broadcast by determining that an episode is scheduled for broadcast in the program data, but is one not identified as scheduled for broadcast at a start time designated in an associated episode record chart and/or episode history chart. A new or special episode is one not scheduled for broadcast at a start time designated in an associated episode record chart, is one scheduled for broadcast at a start time within a time window corresponding to the scheduled episode record start time, or is one scheduled for broadcast at a broadcast start time designated in an episode exclude chart. For example, episode history chart 800 designates a record start time of 8:00 p.m. for Sunday episodes of a program which correlates with episode 602 of The Symptoons in program guide 600. A new or special episode 606 of the program is scheduled for broadcast at 8:30 p.m. in program guide 600 which is recognized by recording application 316.

At block 962, the recording application determines whether there has been a broadcast time change for the episodes of the program. Identifying when each episode of the program is recorded (e.g., block 954) is one of many possible implementations that enable the recording application to determine a broadcast time change for the program. For example, episode history chart 800 designates a record start time of 8:00 p.m. for Sunday episodes of a program. However, in week three (3) and week four (4), the 8:00 p.m. program episodes were not recorded, as identified by labels 814 and 818 (e.g., open circles).

If the recording application recognizes that an episode of the program is not being recorded after any number of scheduled record start times, and/or recognizes that an episode of the program is scheduled to be broadcast at a time other than the previous scheduled broadcast time, the recording application can determine a broadcast time change for the program. If a broadcast time change for a program is not determined (i.e., "no" from block 962), the new or special episode of the program is recorded in its entirety when the episode is broadcast at block 964.

The recording application can also recognize that the new or special program episode may be scheduled to start before or after a designated record start time, or may be scheduled for broadcast for a longer than normal time duration, such as a special forty minute episode of a sitcom, rather than the conventional thirty minutes. The recording application recognizes a broadcast having a longer than normal time duration by determining the broadcast time length of each episode from the program guide. Thus, every episode of a program can have a different broadcast time length and it would be recorded in its entirety.

If a broadcast time change for a program is determined (i.e., "yes" from block 962), an episode record chart can be modified to include a new record start time corresponding to the scheduled broadcast time change for the program episodes at block 966. For example, the recording application recognizes that the week three (3) and week four (4) 8:00 p.m. program episodes were not recorded, as designated in episode history chart 800. The recording application also recognizes that an episode of the program is scheduled to be broadcast at 8:30 p.m. on the same day and modifies episode record chart 704 to include the new 8:30 p.m. scheduled broadcast time.

At block 968, the designated record start time for the program episodes is deleted from the episode record chart. For example, episode record chart 800 indicates, in week seven (7) . . . week N, that the 8:00 p.m. scheduled broadcast start time has been deleted and only the new 8:30 p.m. broadcast start time is designated. The recording application can update episode record chart 704 accordingly to include the new record start time at 8:30 p.m. Further, the recording application can rebuild the episode exclude chart to represent a shift in the time window corresponding to the new program episode start time. At block 970, the program episodes are recorded when the episodes are broadcast at the new record start time designated in the episode record chart. For example, labels 828 and 832 indicate (e.g., closed circle) that the program episode was recorded at 8:30 p.m. on Sunday for week six (6) and week seven (7).

CONCLUSION

Although the systems and methods have been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. A method implemented by a client device, the method comprising:

receiving, by the client device, a viewer request to record episodes of a program at a selected broadcast start time and day;

creating a program event to record the episodes of the program, wherein creating the program event comprises generating an episode record chart, an episode exclude chart and a history chart for the program;

establishing a time window that includes a first time period before the selected broadcast start time of the episodes of the program and a second time period after the selected broadcast start time of the episodes, wherein the first and second time periods are consecutive to form the time window centered about the selected broadcast start time;

listing days and times at which episodes of the program will be recorded in the episode record chart for the program;

determining, by the client device, from program guide information additional episodes of the program scheduled for broadcast within the time window having broadcast start times within the time window at times other than the selected broadcast start time;

listing the additional episodes having broadcast start times within the time window at times other than the selected broadcast start time in an episode exclude chart, wherein the episode exclude chart lists broadcast days and times of the additional episodes scheduled for broadcast within the time window that will not be recorded;

maintaining the history chart for the program by including information comprising:

whether an episode of the program was recorded at a scheduled broadcast time;

whether the episode of the program was broadcast as scheduled but not recorded; and whether the episode of the program was not broadcast as scheduled and not recorded;

determining from the program guide information that an episode of the program is scheduled for broadcast at a new broadcast time earlier or later than the selected broadcast start time;

referring to the history chart to determine that one or more episodes have been previously recorded at the new broadcast time, and not broadcast and recorded at the selected broadcast start time; and designating, by the client device, the new broadcast time as a new selected broadcast start time for recording future episodes of the program.

2. A method as recited in claim 1, further comprising:

following generating the episode exclude chart and listing the additional episodes, recognizing a special episode of the program scheduled for broadcast within the time window, wherein the special episode is determined utilizing the episode record chart, episode exclude chart, and history chart by determining from the program guide information that the special episode is scheduled for broadcast in the time window and is not included in the episode exclude chart; and recording the special episode of the program when the special episode is broadcast.

3. A method as recited in claim 1, further comprising:

shifting the time window to be centered on the new selected broadcast start time; and rebuilding the episode exclude chart to represent the shifted time window corresponding to the new selected broadcast start time.

4. A method as recited in claim 1, wherein the episode exclude chart designates one or more episode broadcast times to identify the additional episodes of the program that will not be recorded on the same day of the week as the selected broadcast start time.

5. A method as recited in claim 1, the episode exclude chart designates one or more episode broadcast times to identify the additional episodes of the program that will not be recorded on days of the week other than the day of the selected broadcast start time.

6. A method as recited in claim 1, wherein establishing comprises establishing the time window with the first time period being two hours before the selected broadcast start time of the episode of the program and the second time period being two hours after the selected broadcast start time of the episode.

7. A method as recited in claim 1, further comprising requesting an input from a viewer as to whether an additional episode of the program scheduled for broadcast within the time window is to be recorded.

8. A method as recited in claim 1, further comprising, if the viewer's request to record the episodes of the program at the selected broadcast start time corresponds to an episode scheduled for broadcast on a weekend day, determining whether an additional episode of the program is scheduled for broadcast within the time window on any broadcast channel on a weekday;

when an additional episode of the program is scheduled for broadcast within the time window on a weekday, requesting viewer input as to whether to record the additional episode of the program; and adding the additional episode of the program to the episode exclude chart and excluding from recording the additional episode when the additional episode is not selected by the viewer to be recorded.

9. A method as recited in claim 1, further comprising:

if the viewer's request to record the episodes of the program at the selected broadcast start time corresponds to an episode scheduled for broadcast during a television program provider primetime, excluding all additional episodes not scheduled for broadcast during primetime from being recorded, and adding the additional episodes to the episode exclude chart.

10. A method as recited in claim 1, further comprising recording the episodes of the program that are not excluded by inclusion in the episode exclude chart when the episodes that are not included in the episode exclude chart are broadcast.

11. One or more computer storage media comprising computer-executable instructions that, when executed, direct a computing system to perform the method of claim 1.

12. A method implemented by a client device, the method comprising:

receiving, by the client device, a viewer request to record episodes of a program at a selected start time;

establishing a time window that includes a first time period before the selected start time and a second time period after the selected start time, wherein the first and second time periods are consecutive to form the time window about the selected broadcast start time;

determining, by the client device, from program guide information additional episodes of the program that are scheduled for broadcast within the time window at broadcast times other than the selected start time on the same day of the week and on other days of the week as the selected start time;

determining from the program guide information that an episode of the program is scheduled for broadcast at a new broadcast time earlier or later than the selected start time;

referring to a history chart to determine that one or more episodes have been previously recorded at the new broadcast time, and not broadcast and recorded at the selected broadcast start time, wherein the history chart maintains recording history information for the program by including information comprising:

whether an episode of the program was recorded at a scheduled broadcast time;

whether the episode of the program was broadcast as scheduled but not recorded; and whether the episode of the program was not broadcast as scheduled and not recorded; and designating, by the client device, the new broadcast time as a new selected start time for recording future episodes of the program.

13. A method as recited in claim 12, further comprising:

listing the additional episodes having broadcast times within the time window at times other than the selected start time in an episode exclude chart, wherein the episode exclude chart shows broadcast dates and times of the additional episodes scheduled for broadcast within the time window that will not be recorded;

recognizing a special episode of the program scheduled for broadcast within the time window, wherein the special episode is determined utilizing the episode record chart, episode exclude chart, and history chart; and recording the special episode of the program when the special episode is broadcast.

14. A method as recited in claim 13, further comprising:
shifting the time window to be centered on the new selected start time; and
rebuilding the episode exclude chart to represent the shifted time window corresponding to the new selected start time.

15. A method as recited in claim 13, further comprising:
if the viewer's request to record the episodes of the program at the selected start time corresponds to an episode scheduled for broadcast on a weekend day, determining whether an additional episode of the program is scheduled for broadcast within the time window on any broadcast channel on a weekday;
when an additional episode of the program is scheduled for broadcast within the time window on a weekday, requesting viewer input as to whether to record the additional episode of the program; and
adding the additional episode of the program to the episode exclude chart and excluding from recording the additional episode when the additional episode is not selected by the viewer to be recorded.

16. One or more computer storage media comprising computer-executable instructions that, when executed, direct a computing system to perform the method of claim 12.

17. Computer storage media comprising computer-executable instructions that, when executed by a computing system, direct the computing system to perform a method, comprising:
receiving a viewer request to record episodes of a program at a selected start time;
generating an episode record chart associated with the program, the episode record chart designating, for one or more weeks, a start time to record the episodes on one or more days of the one or more weeks;
generating an episode exclude chart associated with the program, the episode exclude chart designating one or more episode broadcast times on one or more days of the week to identify additional episodes of the program that will not be recorded;
establishing a time window that includes a first time period before the selected start time and a second time period after the selected start time;
determining from program guide information additional episodes of the program that are scheduled for broadcast on any channel within the time window at broadcast times other than the selected start time;
determining from the program guide information that an episode of the program is scheduled for broadcast at a new broadcast time earlier or later than the selected start time;
referring to a history chart to determine that one or more episodes have been previously recorded at the new broadcast time, and not broadcast and recorded at the selected broadcast start time, wherein the history chart maintains recording history information for the program by including information comprising:
whether an episode of the program was recorded at a scheduled broadcast time;
whether the episode of the program was broadcast as scheduled but not recorded; and
whether the episode of the program was not broadcast as scheduled and not recorded; and designating the new broadcast time as a new selected start time for recording future episodes of the program.

18. The computer storage media as recited in claim 17, further comprising, if the viewer request to record the episodes of the program at the selected time corresponds to an episode scheduled for broadcast during a television program provider primetime, designating in the episode exclude chart all additional episode broadcast times not scheduled for broadcast during primetime on one or more days of the week.

19. The computer storage media as recited in claim 17, further comprising:
recognizing that an episode of the program is not scheduled to be broadcast at the selected start time designated in the episode record chart; and
labeling a corresponding time slot corresponding to the episode in a recording history for viewer-notification to notify the viewer that the episode of the program was not broadcast at the selected start time.

20. The computer storage media as recited in claim 17, further comprising:
wherein the episode exclude chart shows broadcast days and times of the additional episodes scheduled for broadcast within the time window that will not be recorded;
subsequently to generating the episode exclude chart, recognizing a special episode of the program, wherein the special episode is recognized by determining from the program guide information that the special episode is scheduled for broadcast in the time window and is not included in the episode exclude chart;
recording the special episode of the program when the special episode is broadcast.

21. The computer storage media as recited in claim 17, wherein establishing comprises establishing the time window with the first time period being two or less hours before the selected start time and the second time period being two or less hours after the selected start period.

22. The computer storage media as recited in claim 17, further comprising, if the viewer request to record the episodes of the program corresponds to an episode scheduled for broadcast on a weekend day, determining whether an additional episode of the program is scheduled for broadcast within the time window on any broadcast channel on a weekday.

23. A client device, comprising:
a memory;
a processor coupled to the memory;
an electronic program guide maintained in the memory and executed on the processor;
a recording application configured to:
receive a request to record episodes of a program, the request corresponding to a program title in the electronic program guide;
create a program event to designate a selected start time and one or more days of the week to record the episodes of the program, wherein creating the program event comprises generating an episode record chart, an episode exclude chart, and a history chart;
establish a time window that includes a first time period before the selected start time and a second time period after the selected start time, wherein the first and second time periods are consecutive about the selected start time;
determine from the electronic program guide additional episodes of the program scheduled for broadcast within the time window having broadcast times within the time window at times other than the selected start time;

determine from the program guide that an episode of the program is scheduled for broadcast at a new broadcast time earlier or later than the selected start time;

refer to the history chart to determine that one or more episodes have been previously recorded at the new broadcast time, and not broadcast and recorded at the selected broadcast start time, wherein the history chart maintains recording history information for the program by including information comprising:

whether an episode of the program was recorded at a scheduled broadcast time;

whether the episode of the program was broadcast as scheduled but not recorded; and whether the episode of the program was not broadcast as scheduled and not recorded; and designate the new broadcast time as a new selected start time for recording future episodes of the program.

24. A client device as recited in claim 23, wherein the episode record chart designates one or more start times to record the episodes on one or more broadcast dates.

25. A client device as recited in claim 23, wherein the episode record chart designates, for one or more weeks, a start time to record the episodes on one or more days of the one or more weeks.

26. A client device as recited in claim 23, wherein the episode exclude chart designates one or more additional episode broadcast times to identify additional episodes of the program that will not be recorded on the same of the week as the selected start time.

27. A client device as recited in claim 23, wherein the episode exclude chart designates one or more additional episode broadcast times on one or more days of the week to identify additional episodes of the program that will not be recorded on the one more days of the week other than a day of the week of the selected start time.

28. A client device as recited in claim 23, wherein the recording application is further configured to:

generate the episode exclude chart listing the additional episodes having broadcast times within the time window at times other than the selected broadcast start time in the episode exclude chart, wherein the episode exclude chart shows broadcast days and times of the additional episodes scheduled for broadcast within the time window that will not be recorded;

subsequently to generating the episode exclude chart, recognizing a special episode of the program scheduled for broadcast within the time window, wherein the special episode is determined from the program guide to be scheduled for broadcast at a time in the time window and the special episode is not included in the episode exclude chart; and recording the special episode of the program when the special episode is broadcast.

29. A client device as recited in claim 23, wherein the recording application is further configured to:

shift the time window to be centered on the new selected start time; and rebuild the episode exclude chart to represent the shifted time window corresponding to the new selected start time.

30. A client device as recited in claim 23, wherein the recording application is further configured to establish the time window with the first time period being two or less hours before the selected start time and the second time period being two or less hours after the selected start time.

31. A client device as recited in claim 23, wherein the recording application is further configured to:

receive a request to record an episode that corresponds to a program title in the electronic program guide scheduled for broadcast on a weekend day; and determine from the electronic program guide whether an additional episode of the program is scheduled for broadcast within the time window on any broadcast channel on a weekday.

32. A client device as recited in claim 23, wherein the recording application is further configured to:

receive a request to record an episode that corresponds to a program title in the electronic program guide scheduled for broadcast during a television program provider primetime; and exclude all additional episodes not scheduled for broadcast within the primetime time window on a television program provider channel one or more days of the week from being recorded by adding all the additional episodes in the episode exclude chart.

33. A client device as recited in claim 23, wherein the recording application is further configured to record the episodes of the program that are not excluded by inclusion in the episode exclude chart when the episodes are broadcast.

* * * * *